United States Patent
Bawa et al.

(10) Patent No.: US 8,156,107 B2
(45) Date of Patent: Apr. 10, 2012

(54) SYSTEM AND METHOD FOR JOIN-PARTITIONING FOR LOCAL COMPUTABILITY OF QUERY OVER SHARED-NOTHING CLUSTERS

(75) Inventors: Mayank Bawa, Sunnyvale, CA (US); Anastasios Argyros, San Carlos, CA (US); George Candea, Los Altos, CA (US)

(73) Assignee: Teradata US, Inc., Dayton, OH (US)

( * ) Notice: Subject to any disclaimer, the term of this patent is extended or adjusted under 35 U.S.C. 154(b) by 767 days.

(21) Appl. No.: 11/670,936

(22) Filed: Feb. 2, 2007

(65) Prior Publication Data

US 2008/0189239 A1    Aug. 7, 2008

(51) Int. Cl.
G06F 7/00  (2006.01)
G06F 17/30 (2006.01)
(52) U.S. Cl. ......... 707/713; 707/971; 707/966; 707/972
(58) Field of Classification Search .................. 707/2, 3, 707/713, 971, 972, 966
See application file for complete search history.

(56) References Cited

U.S. PATENT DOCUMENTS

| | | | |
|---|---|---|---|
| 4,769,772 A | | 9/1988 | Dwyer |
| 5,511,190 A | * | 4/1996 | Sharma et al. ............ 707/1 |
| 5,987,449 A | * | 11/1999 | Suciu ....................... 707/3 |
| 6,604,100 B1 | | 8/2003 | Fernandez et al. |
| 7,136,861 B1 | * | 11/2006 | Sinclair et al. .......... 707/101 |
| 7,162,471 B1 | | 1/2007 | Knight et al. |
| 7,356,549 B1 | * | 4/2008 | Bruso et al. ............. 707/200 |
| 2004/0002956 A1 | * | 1/2004 | Chaudhuri et al. ....... 707/2 |

OTHER PUBLICATIONS

Arpaci-Dusseau, Remzi H. et al., Cluster I/O with river: Making the fast case common, In Proceedings of IOPADS, 1999, pp. 10-22, Atlanta, Georgia.
Dewitt, David J. et al., the gamma database machine project, IEEE Transactions of Knowledge and Data Engineering, pp. 44-62, vol. 2, Issue 1, 1990.
Hsiao, H.-I. et al., Chained declustering: A new availability strategy for multiprocessor database machines, Proceedings of $6^{th}$ International Conference on Data Engineering, Feb. 5-9, pp. 456-465, 1990.
Huebsch, Ryan et al., Querying the internet with PIER, Proceedings of the $29^{th}$ VLDB Conference, 2003, Berlin.
Litwin, Witold et al., LH—Linear hashing for distributed files, In Proceedings of SIGMOD, 1993, pp. 327-336, Washington, D.C.

* cited by examiner

*Primary Examiner* — Apu Mofiz
*Assistant Examiner* — Jared Bibbee
(74) *Attorney, Agent, or Firm* — Fliesler Meyer LLP

(57) ABSTRACT

The present invention addresses the problem of partitioning database relations across a plurality of hosts in a shared-nothing cluster while minimizing communication costs. A new partitioning approach for database relations—join-partitioning—is introduced that focuses on relations and their dependencies to a priori partition the plurality of relations to the plurality of hosts such that each host can locally compute a large class of queries over its partitioned data in isolation at query time, independent of other hosts in the cluster. Such an approach thus overcomes the primary bottleneck, i.e., the network, in deploying database systems over shared-nothing clusters by allowing them to seamlessly scale linearly to tens of thousands of hosts and manage tens or hundreds of terabytes of data.

6 Claims, 5 Drawing Sheets

SYSTEM AND METHOD FOR JOIN-PARTITIONING FOR LOCAL COMPUTABILITY OF QUERY OVER SHARED-NOTHING CLUSTERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of query processing over distributed databases.

BACKGROUND

Conventional parallel or distributed relational databases, which include but are not limited to, a MySQL database, an IBM DB2 database, a PostgreSQL database, an Oracle database, and a Teradata database, have opted for shared-nothing clusters (networks), which do not share data storage devices such as hard disk drive and computer memories among hosts in a cluster. Here, a host (node) is a computing device that can be but is not limited to, a server computer, a mainframe computer, a workstation, a laptop or desktop PC, a PDA, a Tablet PC, a Pocket PC, a cell phone, an electronic messaging device, a Java-enabled device, and a FPGA-based device. When a query to a database hosted in a shared-nothing network of a plurality of hosts is computed, data can either be shipped from the plurality of hosts and stored in a central host where query processing can take place, or the query can be processed using a distributed query plan, which ships only relevant data to reduce communication cost and leverage the computational capabilities of the plurality of hosts in the network. Here, communication costs are determined by the placement of data across the plurality of hosts.

Data transmission in response to the query is called dynamic repartitioning. Conventional database systems use one or more of a hash-, range-, or list-partitioned architectures with dynamic repartitioning during query processing, where relations (tables) among data are partitioned either horizontally or vertically. In a horizontal partition of a relation, batches of tuples are placed at each host in the network; while in a vertical partitioning, sets of columns are placed at each host in the network. Such placement decision for a data item made in isolation from any other datum requires significant data movements for processing of queries to the databases. Since communication between hosts is slow, heavy communication costs may be incurred at query time as most of the query time will be spent in routing data in a network in response to each query. Such overhead caused by dynamic repartitioning is exacerbated when these databases are scaled to manage tens of terabytes of data requiring hundreds or thousands of hosts, causing the network to become the primary bottleneck to scalability.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention address the problem of partitioning database relations across a plurality of hosts in a shared-nothing cluster (network) while minimizing communication costs. A new partitioning approach for database relations—join-partitioning—is introduced that focuses on relations and their dependencies to partition them to the plurality of hosts such that each host can locally compute a large class of queries over its partitioned data in isolation at query time, independent of other hosts in the cluster. The key invariant that join-partitioning enforces allows the final answer to such queries to be computed by merely merging the local results from each of the plurality of the hosts. Since no data transmission is required between hosts at query time, i.e., dynamic repartitioning is eliminated, join-partitioning ensures that communication costs remain minimal. Such an approach thus overcomes the primary bottleneck, i.e., the network, in deploying database systems over shared-nothing clusters by allowing them to seamlessly scale linearly to tens of thousands of hosts and manage tens or hundreds of terabytes of data.

Figure 1:
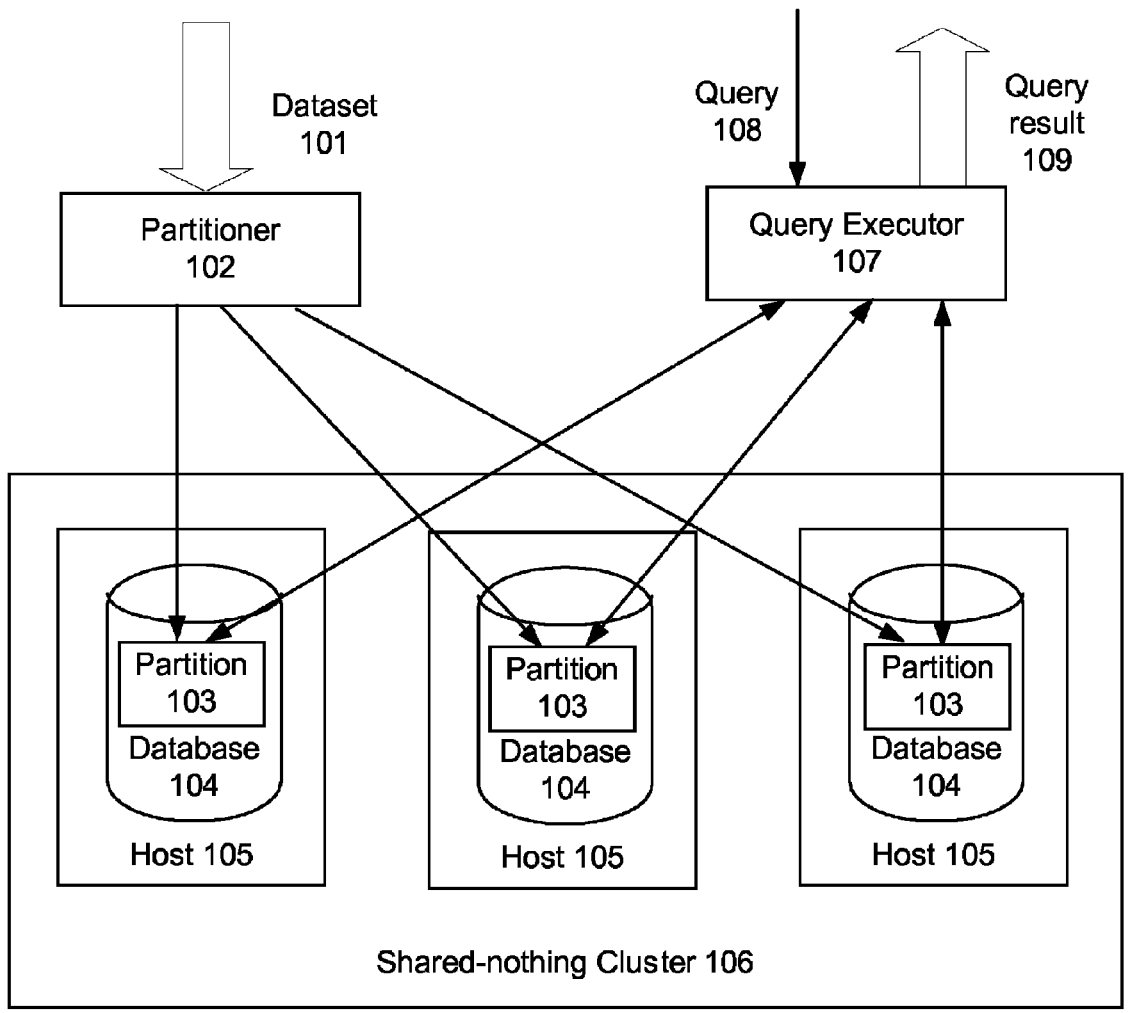
FIG. 1 is an illustration of an exemplary system for join-partitioning for local computability of queries over a shared-nothing cluster in accordance with one embodiment of the present invention.

FIG. 1 is an illustration of an exemplary system for join-partitioning for local computability of queries over a shared-nothing cluster in accordance with one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a partitioner 102 is a (software) partitioning module (partitioner) operable to partition each of a plurality of relations of an input dataset 101 into a plurality of partitions (sub-relations) 103 over a plurality of hosts 105 in a shared-nothing cluster 106, while preserving foreign key constraints/references of the dataset locally on each host. Here, a cache memory and/or (distributed) database 104 can be used to store the partitioned data on each of the plurality of hosts. A query executor 107 is a query executing (software)

module operable to determine if a query 108 to the dataset is locally computable, i.e., if it can be executed over the plurality of hosts without dynamic repartitioning. If so, the query executor can execute the query over the locally partitioned data on the plurality of hosts and generate the query result 109 by merging the output from the plurality of hosts. Notice that there can be a space of possible join-partition candidates for each of the plurality of relations, where each candidate may affect the amount of storage required for the cluster.

In some embodiments, the partitioning of relations across the plurality of hosts to eliminate dynamic repartitioning and ensure local computability is especially suited for a specific class of queries, equi-join SELECT-PROJECT-JOIN (SPJ) queries, where equi-join is a join which contains an equal operator in its join predicate. For a non-limiting example, an equi-join SPJ can be expressed in the form of:

```
Select E.attr1, E.attr2, ....
From D, E
Where D.number = E.number
```

Equi-join SPJ effectively covers a large portion of query space in data warehousing where the later discussed snowflake schemas are the norm.

Figure 2:
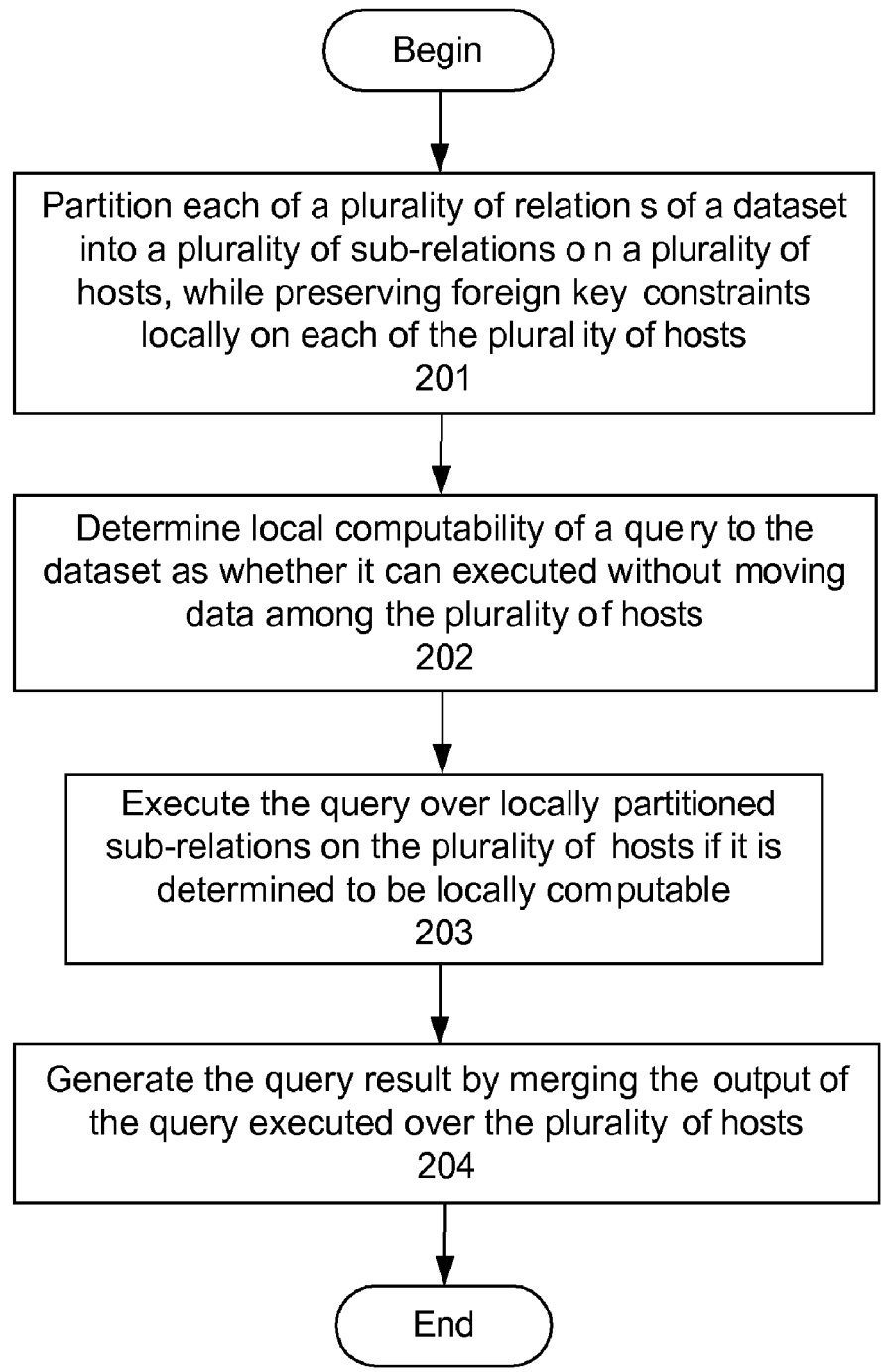
FIG. 2 is a flow chart illustrating an exemplary join-partitioning process for local computability of queries over a shared-nothing cluster in accordance with one embodiment of the present invention.

FIG. 2 is a flow chart illustrating an exemplary join-partitioning process for local computability of queries over a shared-nothing cluster in accordance with one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, each of a plurality of relations in an incoming dataset is partitioned into a plurality of sub-relations (data) over a plurality of hosts at step 201, wherein partitioned sub-relations on each of the plurality of hosts preserves a plurality of foreign key constraints locally. The local computability of a query to the dataset as whether it can be executed without moving data among the plurality of hosts can be determined at step 202. If the query is determined to be locally computable, it can be executed over locally partitioned sub-relations on the plurality of hosts at step 203. The query result can then be generated by merging the output of the query executed over the plurality of hosts at step 204.

In various embodiments of the present invention, four key concepts are introduced and discussed in detail in the following sections:

Local computability: which allows "large" queries to be planned in terms of smaller queries to exploit the join-partitioning. A theoretical algebraic framework is presented under which locally-computed queries over partitioned data on each host can be proven to achieve equivalent results to a global query plan executed over the cluster with dynamic repartitioning. Consequently, "large" queries can be planned in terms of smaller queries to exploit the local-computability of joins at hosts.

Strongly-typed database schema: which allows the end-user of the query to declare the intended usage of schema elements by the appropriate use of foreign key constraints.

Representative sub-relations: which act as semantic caches for database relations on remote hosts.

Join-partitioning: which allows the representative sub-relations to be populated correctly and efficiently.

Local Computability

For detailed discussion of local computability, the following concepts are introduced:

Database Schema: which represents relations in the database by R, S, T, . . . , where each relation contains a set of named attributes, of which exactly one is a primary key. In addition, there are foreign key constraints between relations, which can be viewed as a directed acyclic graph G=(V,E), whose vertices correspond to the relations, V={R,S,T . . . }, and whose edges correspond to the foreign key constraints: if S.B, a primary key of S, is a foreign key referenced by R.A, then (R,S) is an edge with label (A,B). (R.A,S.B) can be used as a shorthand to refer to the edge (R,S) with label (A,B). Note that G is an acyclic graph since a cycle prevents relations from being populated with data.

Partitioning: which refers to the allocation of parts of each relation to different hosts in a shared-nothing cluster. Let n denote the number of hosts, and $R_1, R_2, \ldots, R_n \subseteq R$ denote the parts (sub-relations) of R allocated to the n hosts. Here, two parts of R may overlap, $R_i \cap R_j \neq \Phi$, and the union of all parts need not result in the original relation $(R_1 \cup R_2 \cup \ldots, R_n \neq R)$. Note that overlapping parts cause the union of all parts to require more storage space than R itself.

Join-partitioning: which is a partitioning that preserves all foreign key constraints locally within each host. Formally, if $r \in R_i$ and (R.A,S.B) is a labeled edge, then a unique $s \in S$ such that s.B=r.A occurs in partition $S_i$, i.e., $s \in S_i$. The fact that $s \in S$ is unique is guaranteed by the foreign key constraint. Note that join-partitioning is a property defined over the partitions of all the relations, not just one.

Pure Partitions: relation R is purely partitioned if $R_1, R_2, \ldots, R_n$ are partitions of R in the mathematical sense: $R_i \cap R_j = \Phi$ for all $i \neq j$ and $R_1 \cup R_2 \cup \ldots, R_n = R$. Pure partitions are clearly desirable since they require less space, but there are easily constructible data sets where it is impossible to have all relations purely partitioned without violating the join-partitioning property. However, a join-partition can always be constructed where at least one relation is purely partitioned. Since the graph G is acyclic, the ancestor of a relation can be defined in the natural way: if (R,S) is an edge in the foreign key graph, then R is the parent of S and the ancestor relation is the transitive closure of the parent relation. It follows that an ancestor of a purely partitioned relation in the foreign key graph is also purely partitioned.

In some embodiments, a query can be represented as an undirected graph for the characterization of its local computability. There is one vertex in the graph corresponding to each relation variable in the query. Note that the same relation can occur multiple times in a query as different relation variables (e.g., in a self-join query). In addition, there is an undirected edge between the two relations involved corresponding to each equi-join condition in the query. Further edges can be labeled with the attributes involved in the join. For a non-limiting example, the equi-join condition R.A=S.B results in the undirected edge (R,S) with the label (A,B). There are no edges corresponding to non-equality joins and filter conditions in the query. Clearly, this representation loses some information about the query, but this loss of information is irrelevant to determination of local computability of the query.

In some embodiments, a characteristic graph can be constructed for a query to show that the local computability of the query depends on certain properties of its characteristic graph. The characteristic graph is a directed graph, which contains one vertex corresponding to each relation variable in the query just like the query graph. There can be two kinds of edges in the characteristic graph:

1. If (R.A,S.B) is an (undirected) edge in the query graph, and (R.A,S.B) is a (directed) edge in the foreign key graph, then there is a directed edge (R,S) in the characteristic graph.
2. If (R.A,S.B) is an (undirected) edge in the query graph, and (S.B,R.A) is in the foreign key graph, and R is perfectly partitioned, then there is a directed edge (R,S) in the characteristic graph.

It follows then that under such definition, a query Q is locally computable if and only if there exists a vertex R in the characteristic graph, such that every other vertex in the characteristic graph is reachable from R by following directed edges.

Figure 3:
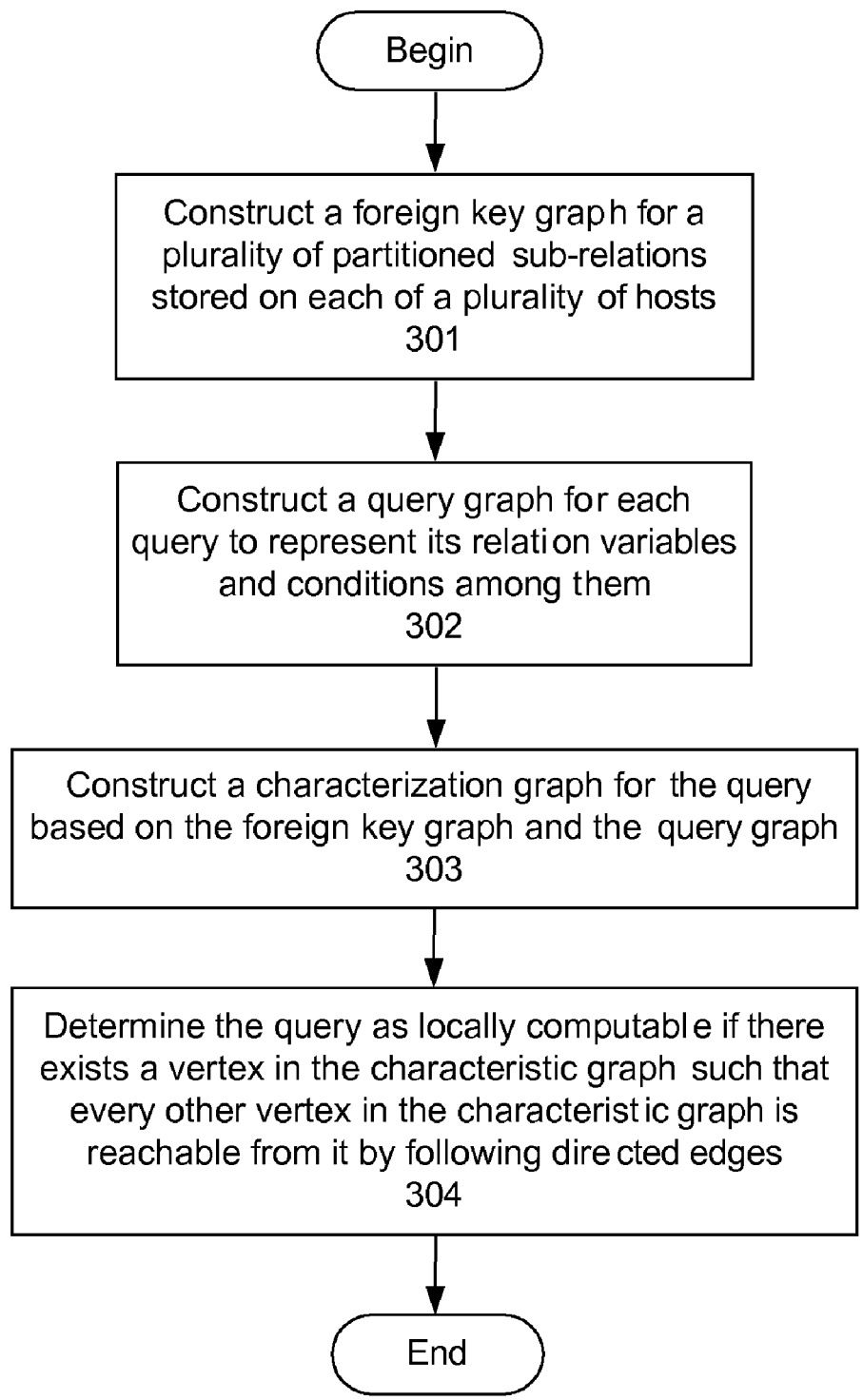
FIG. 3 is a flow chart illustrating an exemplary process for identifying local computability of queries over a shared-nothing cluster in accordance with one embodiment of the present invention

FIG. 3 is a flow chart illustrating an exemplary process for identifying local computability of queries over a shared-nothing cluster in accordance with one embodiment of the present invention as discussed above. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, a foreign key graph is constructed for a plurality of partitioned sub-relations stored on each of a plurality of hosts at step 301. At step 302, a query graph is constructed for each query to represent its relation variables and conditions among them. At step 303, a characterization graph is constructed for the query based on the foreign key graph and the query graph, and the query is determined to be locally computable at step 304 if there exists a vertex in the characteristic graph such that every other vertex in the characteristic graph is reachable from it by following directed edges.

Strongly-Typed Database Schema

In some embodiments, to facilitate join-partitioning and local computability, the notion of typed attributes and typed relations for strongly typed database schema can be introduced and enforced on the incoming dataset, which provides for:

Static typing, where type annotations are associated with relations and attributes when they are declared with CREATE TABLE statements.
Query compile-time checks, which allow the query planner to enforce type constraint violations before execution.
Type safety, that is the rejection of SQL statements which attempt to disregard relation types.
No type conversions, that prevents relations of one type to be altered to another type, either explicitly or implicitly.

In some embodiments, a new attribute type, identifier, can be introduced in addition to the existing SQL-defined base types, which:

is the only attribute type that can participate in foreign key references, either singly or in a set with other identifier attributes, to another relation.
is the only attribute type that is allowed in equi-join predicates between relations.
prohibits the update of attribute values with UPDATE commands.

Representative Sub-Relations

In some embodiments, snowflake schemas can be used as the de-facto standard of modeling of the schema. Various elements of the snowflake schema can be represented by one or more of the following relation types:

Fact relation, which can be used to store recurring events and it allows foreign-key references to other fact, dimension and time relations.
Dimension relation, which can be used to store information about fact participants.
Summary relation, which can be used to store summaries of measures of events at a coarser granularity than the fact relations. It allows only fact relations as the summarized-from relation, restricts the specified identifiers to be a subset of the summarized-from relation identifiers, and inherits the foreign-key relationships from the summarized-from fact relation.
Time relation, which can be used to store information about time of the event.

In some embodiments, the schema discussed above can be applied in the context of a data warehouse, which adopts a snowflake schema that differentiates between fact relations and dimension relations. Here, fact relations record events of interest that occur in an enterprise, and each fact tuple has foreign key references to dimension relations that describe the entities that participated in an event. As non-limiting examples, fact relations can contain tuples that are composed of dimension identifiers (e.g., customerId) and measures (e.g., dollarsSpent). Dimension identifiers are primary keys of dimension relations that have foreign-key references from fact relations. The dimension relations may, in turn, have foreign key references to other (parent) dimension relations. Summary relations may derive from a fact relation, or a finer granularity summary relation, where in the summary relation may also derive from a fact relation and its dimension relations (e.g., rollup all day sales in CA stores which is a result of joining the PointOfSale fact relation with the store dimension relation and then aggregating the joined measures). Notice that set of identifiers in a summary relation is always a subset or equal to the set of identifiers of the base Fact relation. In addition, dimension relations may vary widely in size. For a non-limiting example, a nation dimension relation will only have a maximum of 140 tuples; a products dimension relation may have 100,000 tuples; a customers dimension relation may have one million plus tuples. Time relations are dimension relations for the DATE attribute. They are expected to store "syntactic" and "semantic" information for days (e.g., {2006-09-04, "Monday", Q3, IsHoliday, "Labor Day", "Elections week"}) Separating time into a separate dimension is a data warehousing architect's rule-of-thumb, since "time" quickly becomes a complex hierarchy by itself, more so than the dimension relations for products or customers.

In some embodiments, a large set of queries on snowflake schema comprise of one or more of the following classes:

Single relation operations are as-per SQL specifications.
Equi-join between fact, time and dimension relations only along foreign-key relationships.
Equi-join between summary, time and dimension relations only along foreign-key relationships declared on the base summarized-from fact relations.
Equi-join between dimension and time relations only along foreign-key relationships As discussed later, the remainder set of queries on snowflake schema, which can be but are not limited to, equi-join on non-identifiers, cross products, non-equi joins, self-joins of fact relations on identifiers, are not amenable to local-computability.

Figure 4:
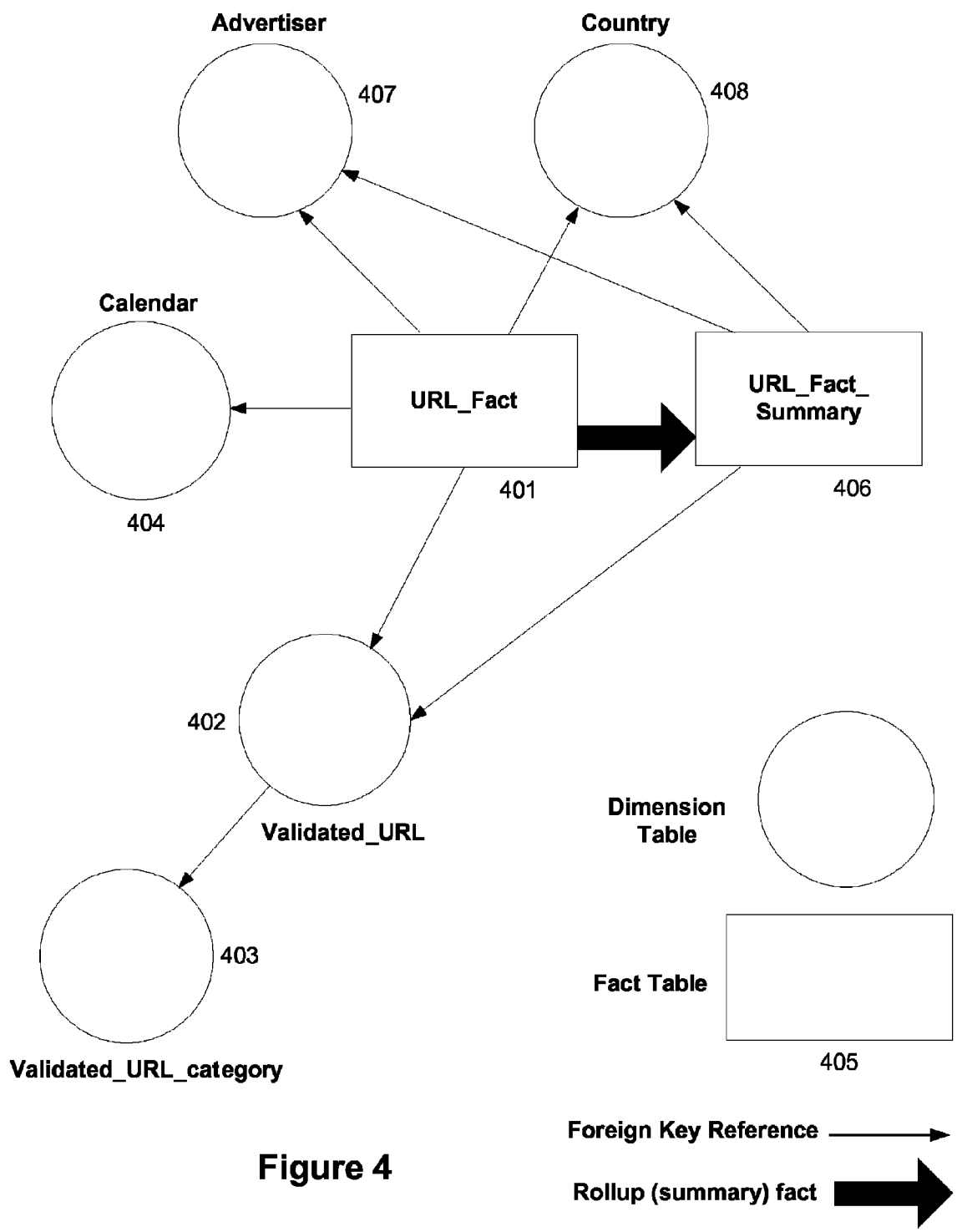
FIG. 4 shows an exemplary snowflake schema data model in accordance with one embodiment of the present invention.

FIG. 4 shows an exemplary snowflake schema data model in accordance with one embodiment of the present invention. Referring to FIG. 4, Url_Fact 401 is a fact relation that records events associated with a URL that was served with an advertisement by the advertising network. Each tuple in the fact relation has dimension identifiers (e.g., ValidatedURLId, CalendarId, AdvertiserId and CountryId) and measures (e.g., impressions, clicks, conversions, amtReceivedFromBuyer, roiValue, roiCost). The Validated_URL_402 is a dimension relation that references another dimension relation Validated_URL_Category 403 that segments URLs into distinct non-overlapping categories. The Calendar relation 404 is a time relation which stores the year, month, day and hour in which the event occurred. The Fact relation 405 itself is rolled-up into a summary relation URL_Fact_Summary 406, which aggregates the measures for each combination of dimension identifiers. Notice that in this case, the rollup is on the calendar dimension relation that results in tuples with dimension identifiers to the remaining three dimension relations (Country 407, Advertiser 408, Validated_URL 402).

In some embodiments, queries on a snowflake-schema perform group-bys and aggregates on fact relation measures while selecting on the dimension attributes. Such queries involve an equi-join between fact and dimension relations on the foreign-key dimension id attributes.

Join-Partitioning

Figure 5:
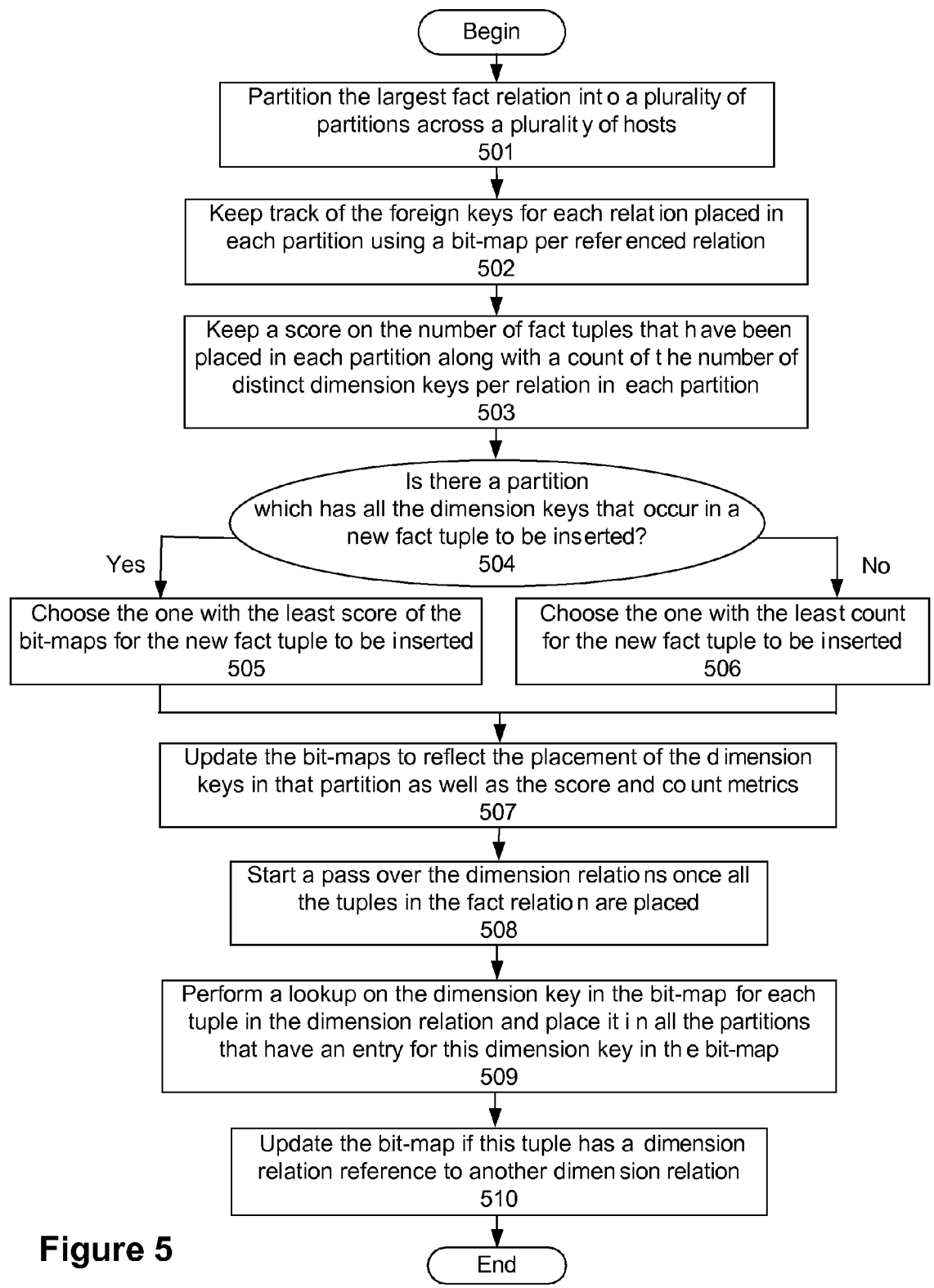
FIG. 5 is a flow chart illustrating an exemplary greedy approach to dynamically determine a good partitioning candidate for each of the plurality of relations of the input dataset while keeping data balanced across the plurality of hosts in accordance with one embodiment of the present invention.

FIG. 5 is a flow chart illustrating an exemplary greedy approach to dynamically determine a good partitioning candidate for each of the plurality of relations of the input dataset while keeping data balanced across the plurality of hosts in accordance with one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 5, the largest fact relation is first partitioned into a plurality of partitions across a plurality of hosts at step 501. While the fact relation is being partitioned, the partitioner keeps track of the foreign keys for each relation that is placed in each partition using a bit-map per referenced relation at step 502. Simultaneously, the partitioner keeps a score on the number of fact tuples that have been placed in each partition, along with a count of the number of distinct dimension keys per relation in each partition at step 503. When a new fact tuple is inserted, the partitioner looks up the bit-maps to determine if there is a partition which has all the dimension keys that occur in this tuple at step 504. If there is one or more candidate partitions, the partitioner chooses the one with the least score of the bit-maps for the new fact tuple to be inserted at step 505. If there are no candidate partitions, the partitioner chooses the one with the least count for the new fact tuple to be inserted at step 506; the bit-maps are then appropriately updated to reflect the placement of the dimension keys in that partition as well as the score and count metrics at step 507. Once all the tuples in the fact relation are placed, the partitioner makes a pass over the dimension relations at step 508. For each tuple in the dimension relation, the partitioner performs a lookup on the dimension key in the bit-map, and the tuple is placed in all the partitions that have an entry for this dimension key in the bit-map at step 509. If this tuple has a dimension relation reference to another dimension relation, the bit-map is updated to reflect such placement for the key in that dimension relation at step 510. Since snowflake schemas do not have cycles in foreign-key references, the order of inserting relations can be appropriately chosen.

Since the placement approach is based on the framework and principles discussed earlier, it ensures at least the following guarantees:

1. Each fact tuple is placed in exactly one partition. The fact relations are thus complete and disjointly partitioned (i.e., have pure partitions).
2. Each dimension tuple may be replicated in multiple partitions. The dimension relations are join-partitioned (i.e., satisfy the foreign key constraints). The degree of replication is greedily reduced by the partitioner using a count function.

Both of the guarantees imply the local computability of equi-join SPE queries on each host in the cluster, and such queries can be executed without incurring communication costs.

In some embodiments, a snowflake schema can occur in a combination of one or more of the following simple patterns: singleton relations (e.g., F), star schema (e.g., F->D1, F->D2), snowflaked-dimension schema (e.g., F->D1->D2), and summary relations (e.g., S<=F2->D).

In some embodiments, incoming tuples of a fact relation with no foreign key references can be partitioned using a hash-function on the identifier attributes for singleton relations, while the incoming tuples of a fact relation having no identifier attributes can be partitioned using a round-robin strategy.

In some embodiments, a dimension relation is partitioned using a hash-function on its identifier attributes for star schema. If a fact relation has foreign-key references, the incoming tuples can be partitioned into W clusters on the foreign-key identifiers, where W is the number of hosts in the system. At each host, an internal representative sub-relation relation can be created pro-actively that stores only the dimension tuples having identifiers in the local fact relation partition. Furthermore, the following invariant is ensured at all times: a representative sub-relation relation at a host has tuples that are a super-set of all dimension tuples referenced by the local fact relation partition.

In some embodiments, the goal of the fact relation cluster partitioning is to create the smallest representative sub-relation that is sufficient to correctly perform an equi-join for the local fact relation partition. A small representative sub-relation helps reduce disk-usage at hosts while speeding up query processing. The internal representative sub-relation is pro-actively maintained to ensure the invariant above even as the base dimension relation is operated on by UPDATES and DELETES and/or the fact relation is operated upon by INSERTs. Each newly inserted fact tuple that references a dimension tuple will cause a corresponding insert (if necessary) in the representative sub-relation before the fact tuple is committed. Note that update of identifier attributes is prohibited, which ensure that each UPDATE or DELETE of dimension relations and UPDATE of fact relations result in local operations on the representative sub-relations as well.

In some embodiments, the representative sub-relation is not maintained pro-actively as the fact relation is operated upon by DELETEs. The representative sub-relation can be periodically garbage-collected to remove the unreferenced dimension tuples.

When an end-user requests the creation of a relation using a CREATE TABLE statement, the query can be rewritten to create a relation at each host, if relation type is Fact, Summary or Time and/or a relation and an internal representative sub-relation at each host, if relation type is Dimension.

In some embodiments, a new data-structure, tuple context cache, can be defined which records the placement of dimension identifiers in representative sub-relations per host. The tuple context cache supports the following two read operations:

Given a dimension relation name and a dimension identifier, return the set of hosts that have the said dimension identifier in their local representative sub-relation for the said dimension relation.

Given a dimension relation name and a host id, return the number of dimension identifiers that exist in the local representative sub-relation for the said dimension relation name at the said host.

In addition, the tuple context cache supports the following two write operations:

Given a dimension relation name and a dimension identifier, make a new entry for the said dimension identifier with a O-size set of hosts.

Given a dimension relation name, a dimension identifier and a host id, insert the host id into the set of hosts that have the said dimension identifier in their local representative sub-relation for the said dimension relation.

An integer array, Weight, for each dimension relation name which can also be used to maintain a running count of dimension identifiers that are placed at the corresponding host.

In some embodiments, a snowflake schema can be represented as a Directed Acyclic Graph (DAG) with relations as nodes and foreign-key references between relations as edges between nodes. In order to satisfy the foreign-key references, the order of loading data into the database must be from the leaf (zero outgoing references) to the root (zero incoming references) of the DAG. This implies that dimension relations must always be loaded before any fact relations that reference such dimension relations.

In some embodiments, a simple online clustering approach can be used for partitioning/placing fact tuples into clusters, which works as follows: for each tuple, find the hosts that already have a large subset of the referenced dimension identifiers in their representative sub-relations. Among the hosts, choose the one which has the smallest size of representative sub-relations to ensure load-balancing. As a result of this choice, if a host gets a new dimension identifier, record the fact for placing this dimension tuple in its representative sub-relation when all the tuples in this batch insert have been processed.

In some embodiments, there are several improvements possible on the basic scheme. For a non-limiting example, batch-processing of fact tuples can be performed, where a batch is a configurable parameter with a maximum size of free memory at Loader. A batch processing has two key advantages:

More accurate clustering than a per-tuple decision

More efficiency by merging adjacent tuple lookup requests on the Tuple Context Cache.

For each incoming tuple t that belongs to a time relation, the tuple t can be replicated at each host. If t is for a dimension relation, (identifier of t) can be hashed to obtain a host where the tuple must be placed. The representative sub-relation entries can then be looked up where the corresponding fact-tuples are placed in that host's representative sub-relation. The advantage in this scheme is that the number of instances the hosts have to be queried and then dimension tuples have to be shuffled across hosts can be cut down.

In some embodiments, the fact relation and first-level dimension relation for the snowflaked-dimension schema can be treated in the same way as in star schema discussed above. Simultaneously, the next-level dimension relations at each host can be partitioned to create representative relations for such dimension relations as well.

In some embodiments, raw data inserts into Summary relations can be disallowed by definition. The only way to populate summary relations are through UPSERT commands, i.e., a combination of INSERT INTO . . . (SELECT . . . ) or UPDATE . . . (SELECT . . . ) statements where the SELECT-ed relation must be the summarized-from fact relation perhaps equi-joined with other assorted foreign-key referenced dimension relations. Such UPSERT commands can be executed in parallel across all hosts because of invariant discussed above.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, class, method, type, interface, bean, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support data partitioning for local computability of queries, comprising:

a shared-nothing cluster including a plurality of hosts sharing no hard disk drive and/or computer memory among the hosts;

a partitioning module operable to actively partition each of a plurality of relations of a dataset as the dataset is being provided by an external user of the system into a plurality of sub-relations and to store the sub-relations on the plurality of hosts, the partitioning module performing join partitioning while preserving one or more foreign key references locally on each of the hosts, the partitioning module being constrained to provide partitions which have data that allow for local computability of queries, and the sub-relations constrained to always output correct answers in response to a query, and the partitioning module being operable to keep a plurality of partitions of the sub-relations balanced across the plurality of hosts via one or more of:
(i) keeping track of the foreign keys for each of the plurality of sub-relations that are placed on each of the plurality of partitions using a bit-map per referenced relation;
(ii) keeping a score on the number of tuples of the sub-relations that have been placed in each of the plurality of partitions along with a count of the number of distinct dimension keys per relation in each of the plurality of partitions;
(iii) looking up the bit-maps to determine if there are one or more candidate partitions which have all the dimension keys that occur in a tuple;
(iv) inserting the tuple into the partition with the least score of the bit-maps if there are one or more candidate partitions or into the one with the least count if there is no candidate partition; and
(v) updating the bit-maps to reflect the placement of the dimension keys in that partition as are the score and count; and
a query executing module operable to:
receive a query and identify at query time whether the query to the dataset is computable over the plurality of sub-relations locally on each of the plurality of hosts independent of the rest of the plurality of hosts, and in which a given received query is ad hoc and unpredictable, the query executing module being operable to identify local computability of the query at query time by:
(i) constructing a characterization graph of the query whose vertices correspond to relation variables in the query for each of the plurality of databases; and
(ii) determining if there exists a vertex in the characterization graph such that every other vertex in the characteristic graph is reachable from it by following directed edges;
execute the query over the plurality of partitioned sub-relations stored on the plurality of hosts without moving data among the hosts or causing network bottlenecks; and
generate an exact result for each query by merging local query output from the plurality of hosts.

2. The system according to claim 1, wherein:
each of the plurality of hosts is one of: a server computer, a mainframe computer, a workstation, a laptop or desktop PC, a PDA, a Tablet PC, a Pocket PC, a cell phone, an electronic messaging device, a Java-enabled device, and a FPGA-based device.

3. The system according to claim 1, wherein:
the partitioning module is operable to model the plurality of relations via a snowflake schema; and
the snowflake schema comprises a plurality of relations maintaining one or more of the following information: a plurality of recurring events, a plurality of participants in the plurality of recurring events, summary of measures of the plurality of recurring events, and time of the plurality of recurring events.

4. The system according to claim 1, wherein:
the partitioning module is operable to model the plurality of relations via a snowflake schema; and
the snowflake schema is a combination of one or more of: one or more singleton relations, star schema, snowflaked-dimension schema, and one or more summary relations.

5. The system according to claim 3, wherein:
the partitioning module is operable to dynamically determine one or more partition candidates for each of the plurality of relations based on the snowflake schema.

6. The system according to claim 1, wherein:
the query class is an equi-join SELECT-PROJECT-JOIN (SPJ) query.

* * * * *